(12) United States Patent
Keller

(10) Patent No.: US 8,116,940 B2
(45) Date of Patent: Feb. 14, 2012

(54) SYSTEMS AND METHOD FOR COLLECTING DATA IN A VEHICLE

(75) Inventor: Kirby J. Keller, Chesterfield, MO (US)

(73) Assignee: The Boeing Company, Chicago, IL (US)

( * ) Notice: Subject to any disclaimer, the term of this patent is extended or adjusted under 35 U.S.C. 154(b) by 908 days.

(21) Appl. No.: 12/141,806

(22) Filed: Jun. 18, 2008

(65) Prior Publication Data

US 2009/0319116 A1 Dec. 24, 2009

(51) Int. Cl.
*G02B 6/44* (2006.01)
*G06F 17/00* (2006.01)

(52) U.S. Cl. ............... 701/39; 701/3; 385/53; 385/101
(58) Field of Classification Search ............... 701/3, 29; 385/101–104, 106, 53, 76, 77; 439/577; 174/117 M
See application file for complete search history.

(56) References Cited

U.S. PATENT DOCUMENTS

| | | | |
|---|---|---|---|
| 3,984,622 A * | 10/1976 | Ross | 174/72 A |
| 4,365,865 A | 12/1982 | Stiles | |
| 4,804,806 A * | 2/1989 | Orr et al. | 174/117 M |
| 5,551,484 A | 9/1996 | Charboneau | |
| 5,917,977 A * | 6/1999 | Barrett | 385/101 |
| 6,265,880 B1 | 7/2001 | Born et al. | |
| 6,666,400 B2 * | 12/2003 | White, III | 244/1 R |
| 6,907,416 B2 * | 6/2005 | Tasooji et al. | 706/50 |
| 7,095,493 B2 | 8/2006 | Harres | |
| 7,240,599 B2 * | 7/2007 | Nolan | 87/8 |
| 7,280,941 B2 | 10/2007 | Bonanni et al. | |
| 7,310,430 B1 * | 12/2007 | Mallya et al. | 382/101 |
| 7,333,917 B2 | 2/2008 | Greis et al. | |
| 7,356,612 B2 * | 4/2008 | Rachlin | 709/242 |
| 2005/0021632 A1 * | 1/2005 | Rachlin | 709/206 |
| 2006/0149437 A1 * | 7/2006 | Somos | 701/29 |
| 2007/0290803 A1 * | 12/2007 | Ayyagari et al. | 340/10.1 |
| 2008/0036617 A1 | 2/2008 | Arms et al. | |
| 2008/0228331 A1 * | 9/2008 | McNerney et al. | 701/3 |
| 2009/0139740 A1 * | 6/2009 | Lindsey et al. | 174/50.5 |

FOREIGN PATENT DOCUMENTS

| | | |
|---|---|---|
| DE | 102004042101 A1 | 3/2006 |
| EP | 0095254 A | 11/1983 |
| FR | 2659159 A | 9/1991 |

OTHER PUBLICATIONS

European Search Report of Application No. 09163174.7-2211; Aug. 25, 2009; 6 pages.
EPO Office Action of Application No. 09 163 174.7-2211; Aug. 12, 2010; 5 pages.
Communication pursuant to Article 94(3) EPC for GB 09 163 174.7; Feb. 15, 2011; 6 pages.

* cited by examiner

*Primary Examiner* — Ruth Ilan
(74) *Attorney, Agent, or Firm* — Armstrong Teasdale LLP

(57) ABSTRACT

A data collection system for a vehicle is provided. The data collection system includes a first data collection node configured to obtain data from a vehicle subsystem, and a processor communicatively coupled to the data collection node via a wiring system, wherein the wiring system includes a plurality of conductors and an overbraid surrounding said plurality of conductors, said overbraid comprising at least one fiber optic cable integrally woven therein and configured for the transmission of data related to an operational status of the vehicle subsystem.

20 Claims, 5 Drawing Sheets

SYSTEMS AND METHOD FOR COLLECTING DATA IN A VEHICLE

BACKGROUND OF THE DISCLOSURE

The field of the invention relates generally to data collection and more specifically to the use of fiber optics for collecting data to support Integrated Vehicle Health Management (IVHM).

IVHM is the collection and processing of data to determine (diagnosis) and predict (prognosis) an operational status (i.e., health) of a vehicle system or subsystem, and enable the mitigation of adverse events during operation. Hardware faults and failures are typically difficult to detect, diagnose and mitigate with existing technologies during operation. However, the time needed to address the faults and failures impacts mission availability. Additionally, computer software related risks represent equally serious threats due to increased system complexity and a higher reliance upon automation.

Some known IVHM systems may be used on-board aircraft to support flight critical processes and decisions, and include hardware and software elements that support the maintenance and logistics processes and decisions, but that do not substantially impact mission or flight critical processes or decisions. Some known IVHM solutions include passively monitoring avionics data bus traffic or capturing and processing subsystems data within flight critical processors at the subsystem or core processor level. Known data acquisition and collection methods do not support more advanced IVHM functions, particularly health prediction or prognostics. Avionics data buses handle the data necessary to control the vehicle and generally do not support access to higher fidelity data within subsystems controllers, nor do such data buses support implementation of higher bandwidth 'IVHM sensors' that monitor vibration, current or structural harmonics. The development and validation costs associated with embedding such support critical IVHM processing within flight critical processors is may be prohibitive.

BRIEF DESCRIPTION OF THE DISCLOSURE

One aspect is directed to a data collection system for a vehicle. The data collection system includes a first data collection node configured to obtain data from a vehicle subsystem, and a processor communicatively coupled to the data collection node via a wiring system, wherein the wiring system includes a plurality of conductors and an overbraid surrounding said plurality of conductors, said overbraid comprising at least one fiber optic cable integrally woven therein and configured for the transmission of data related to an operational status of the vehicle subsystem.

Another aspect is directed to a wiring system for a vehicle that includes an overbraid configured to receive at least one wire therein, and at least one fiber optic cable integrally woven within the overbraid and configured to transmit data along said fiber optic cable.

Another aspect is directed to a method for collecting data in a vehicle, wherein the vehicle includes an on-board processor. The method includes communicatively coupling a first data collection node to the processor via a wiring system, wherein the wiring system including an overbraid and a plurality of fiber optic cables woven into the overbraid, receiving data from a vehicle subsystem at the first data collection node, and transmitting the data related to an operational status of the vehicle subsystem from the data collection node to the processor via at least one fiber optic cable.

Various refinements exist of the features noted in relation to the above-mentioned aspects of the present invention. Further features may also be incorporated in the above-mentioned aspects of the present invention as well. These refinements and additional features may exist individually or in any combination. For instance, various features discussed below in relation to any of the illustrated embodiments of the present invention may be incorporated into any of the above-described aspects of the present invention, alone or in any combination.

DETAILED DESCRIPTION

Figure 1:
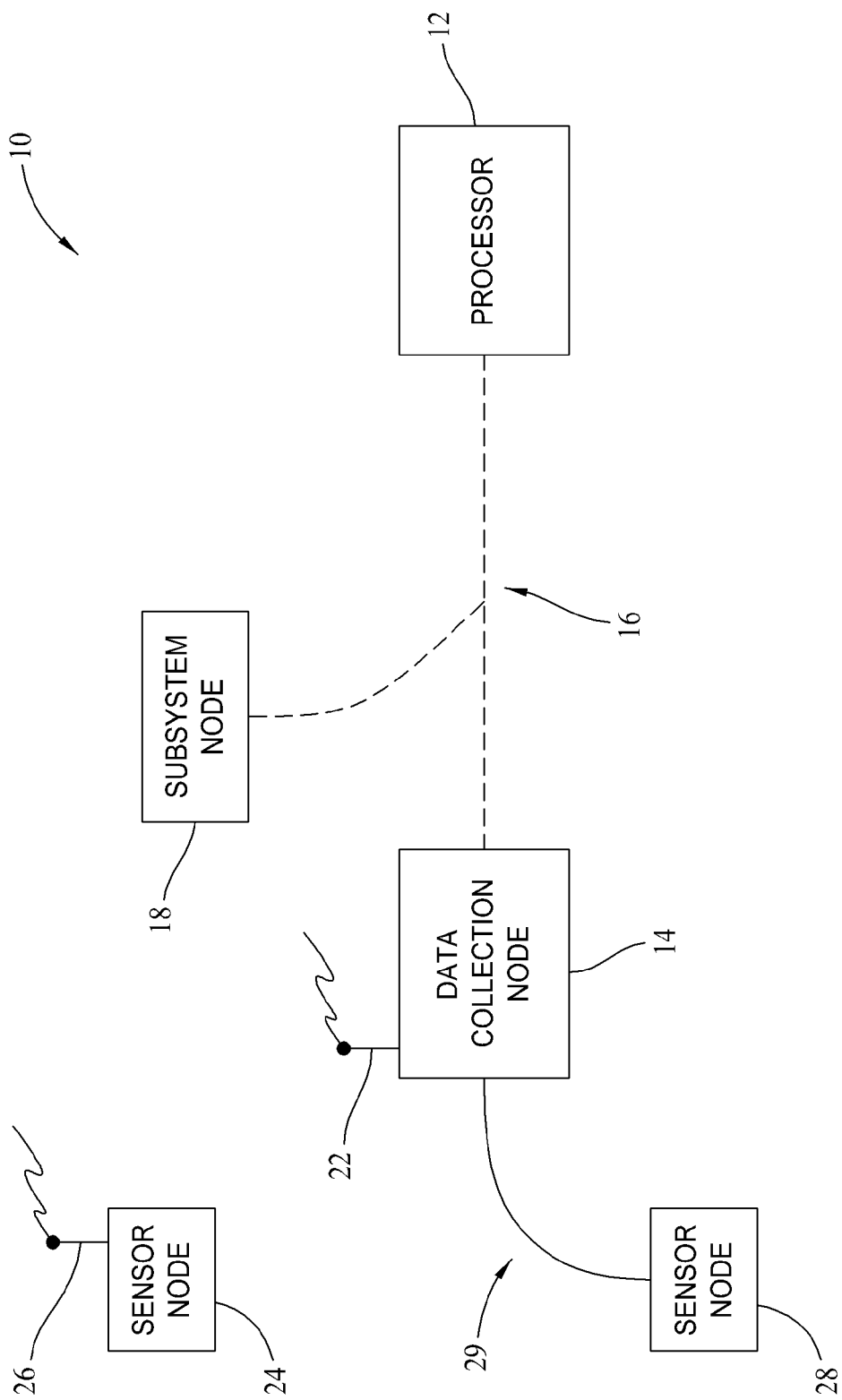
FIG. 1 is a schematic of an exemplary data collection system.

FIG. 1 is a schematic of an exemplary data collection system 10. In the exemplary embodiment, system 10 is installed within an aircraft (not shown) to support flight critical processes and decisions, and maintenance and logistics processes and decisions. System 10 includes a core processor 12 that is operatively coupled to a data collection node 14 via a wiring harness 16. At least a portion of the operative coupling of wiring harness 16 includes a fiber optic embedded wiring system, as described in more detail herein. In an alternative embodiment, core processor 12 may be operatively coupled to a subsystem node 18 alone or in combination with data collection node 14. In the exemplary embodiment, subsystem node 18 is an accelerometer configured to measure vibration in a subsystem component (not shown). Alternatively, subsystem node 18 may be any sensor configured to measure a desired system quantity. In alternative embodiments, system 10 may include a plurality of subsystem nodes 18 that are associated with various subsystem components.

In the exemplary embodiment, data collection node 14 includes antenna 22 that enables data collection node 14 to wirelessly communicate with a first sensor node 24 positioned within the vehicle at a physically separate location. First sensor node 24 includes an antenna 26 that enables wireless communications, and may include, without limitation, a strain gauge (not shown), an accelerometer (not shown) configured to sense vibration, or any other sensor configured to passively collect data from a desired system or subsystem. Subsystem node 18 and sensor nodes 24, 28 generally provide IVHM data through various channels as described herein, including via a wire, wirelessly, or via fiber optic connection. Alternatively, and as shown in FIG. 1, a second sensor node 28 may be provided that is configured to passively collect data from a vehicle sub-system, and is communicatively coupled to data collection node via a wiring harness 29. Data collection node is then configured to interpret, or simply forward, the data provided by the sensor nodes 24, 28 to the core processor 12. The data is transmitted via the embedded fiber optics within wiring harness 16. In another embodiment, wiring harness 29 includes a fiber optic communications channel (not shown).

Figure 2:
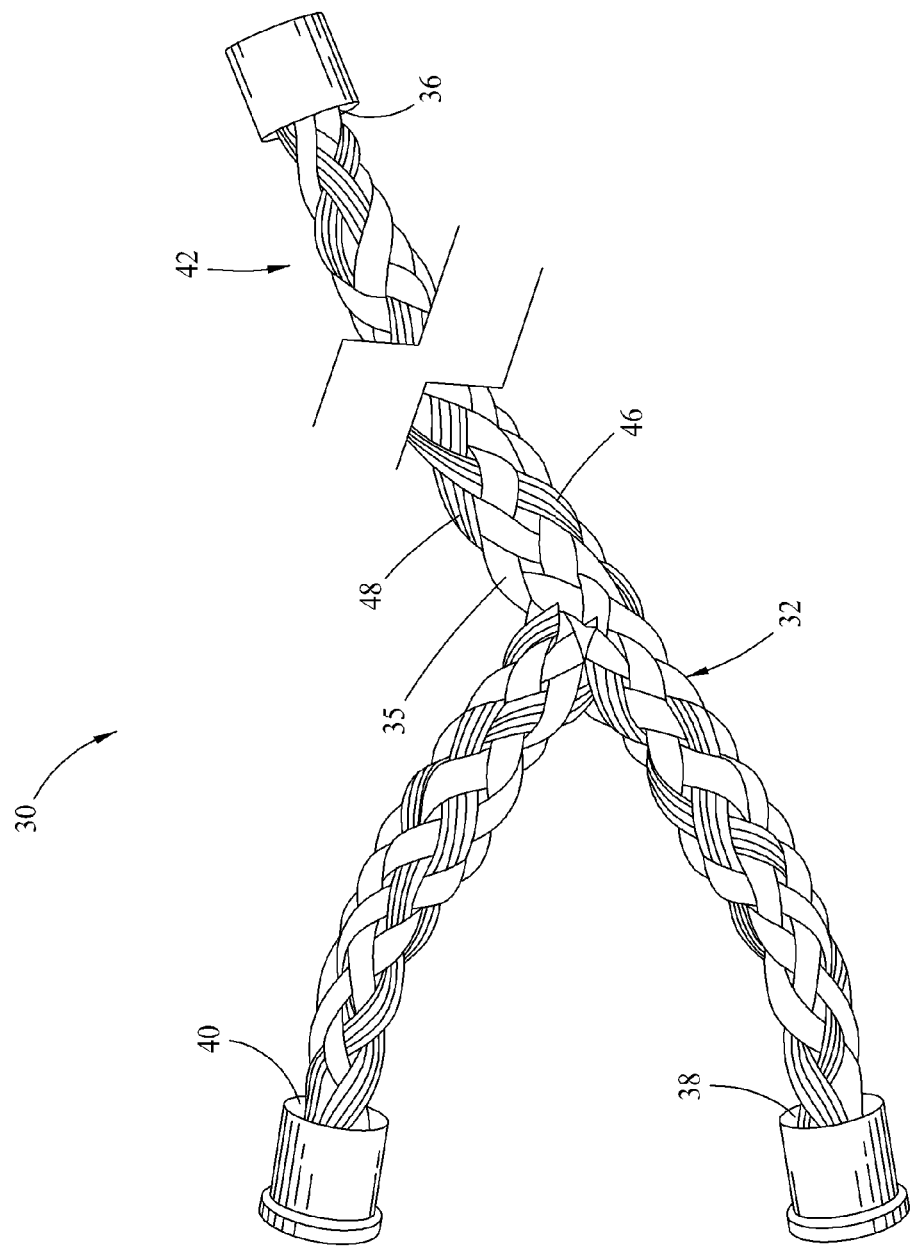
FIG. 2 is a perspective view of an exemplary fiber optic embedded wire system used in the data collection system shown in FIG. 1.
Figure 3:
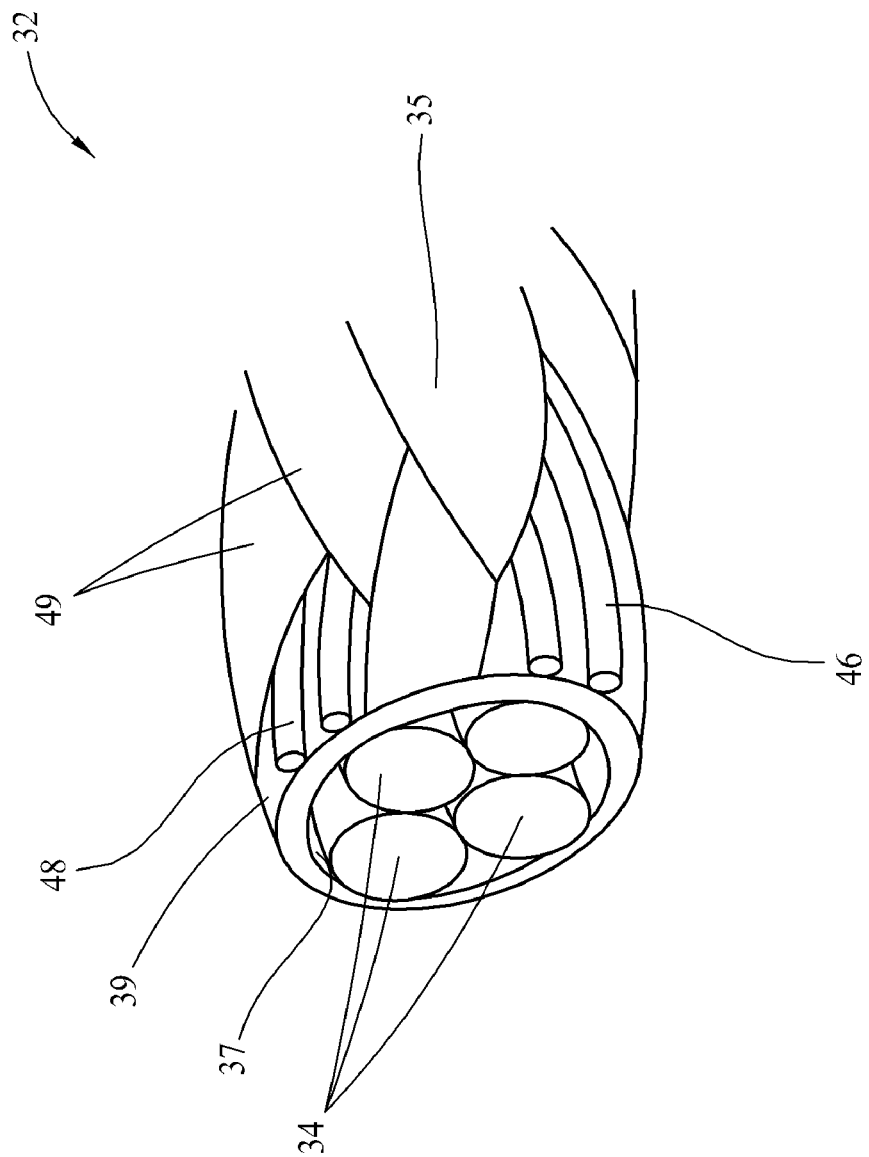
FIG. 3 is a partial internal view of the fiber optic embedded wire system shown in FIG. 2.

Referring to FIGS. 2 and 3, FIG. 2 is a perspective view of an exemplary fiber optic embedded wire system 30 used in the data collection system shown in FIG. 1, and FIG. 3 is a partial internal view of the fiber optic embedded wire system 30 shown in FIG. 2. In the exemplary embodiment, wiring system 30 includes a wire harness 32 that includes multiple, individual conductors 34 (as shown in FIG. 3) held in a group via an overbraid 35 for use in communicatively coupling core processor 12 to components within data collection system 10, as shown in FIG. 1. Specifically, wiring system 30 communicatively couples core processor 12 to at least one of data collection node 14 and subsystem node 18 such that a wire first end 36 is coupled to core processor 12, a wire second end 38 is coupled to data collection node 14, and a wire third end 40 is coupled to sub-system node 18. Alternatively, wire harness 32 is any group of conductors within an overbraid 35 that enables the data collection system 10 to function as described herein. In another embodiment, core processor 12 may be coupled to subsystem node 18 and data collection node with two separate, fiber optic embedded conductors.

Referring to FIG. 2, a plurality of fiber optic cables 42 is integrally woven into overbraid 35. Specifically, and in the illustrated embodiment, a first group of three fiber optic cables 46 and a second group of three fiber optic cables 48 are integrally woven into overbraid 35. This forms a redundancy in the fiber optic communications channels embedded within wiring system 30. The first group 46 and the second group 48 are offset in overbraid 35 such that each lie within a different grouping of strands 49 that form overbraid 35. Alternatively, any number of fiber optic cables may be integrally woven into overbraid 35 such that data collection system 10 may function as described herein. In the exemplary embodiment, fiber optic cables 42 are woven into overbraid 35 such that fiber optic cables 42 pass from an interior 37 of overbraid 35 (shown in FIG. 3) to an external 39 of overbraid 35 (shown in FIG. 3). In another embodiment, fiber optic cables 42 are intermittently woven within overbraid 35 such that data collection system 10 may function as described herein.

Figure 4:
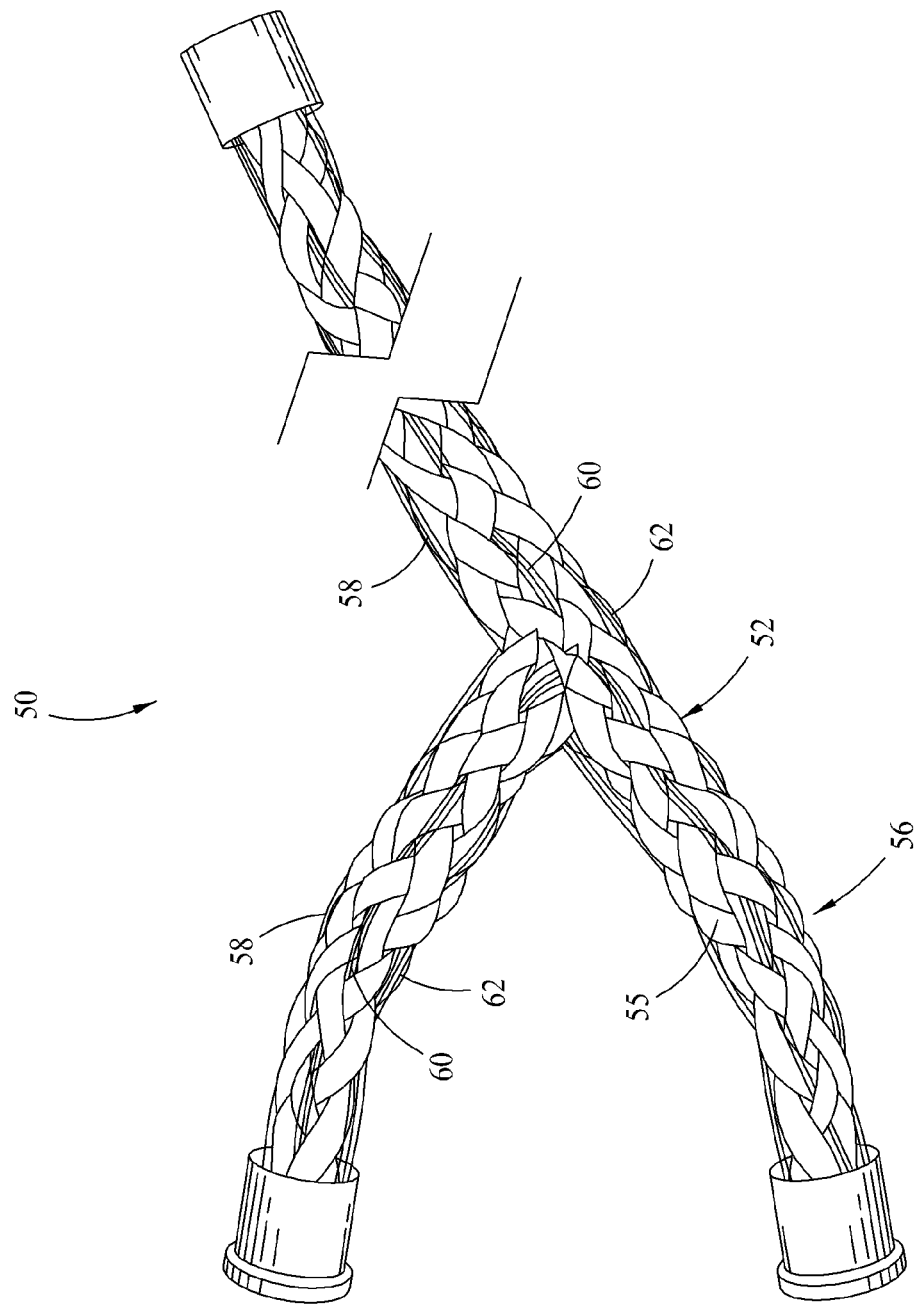
FIG. 4 is a perspective view of an alternative fiber optic embedded wire system.

FIG. 4 is a perspective view of an alternative fiber optic embedded wire system 50 includes a wire harness 52 that includes multiple, individual conductors 34 (as shown in FIG. 3) held in a group via an overbraid 55 for use in communicatively coupling core processor 12 to components within data collection system 10, as shown in FIG. 1. A plurality of fiber optic cables 56 extends substantially longitudinally and substantially linearly throughout overbraid 55. In one specific embodiment, a first group of three fiber optic cables 58, a second group of three fiber optic cables 60, and a third group of three fiber optic cables 62 are spaced circumferentially around overbraid 54 and are inter-woven within overbraid 55 such that each group of fiber optic cables 58, 60 and 62 extends substantially linearly throughout overbraid 55. This forms a redundancy in the fiber optic communications channels embedded within wiring system 50. Alternatively, any number of groups of fiber optic cables may be provided that allows the data collection system 10 to function as described herein.

Figure 5:
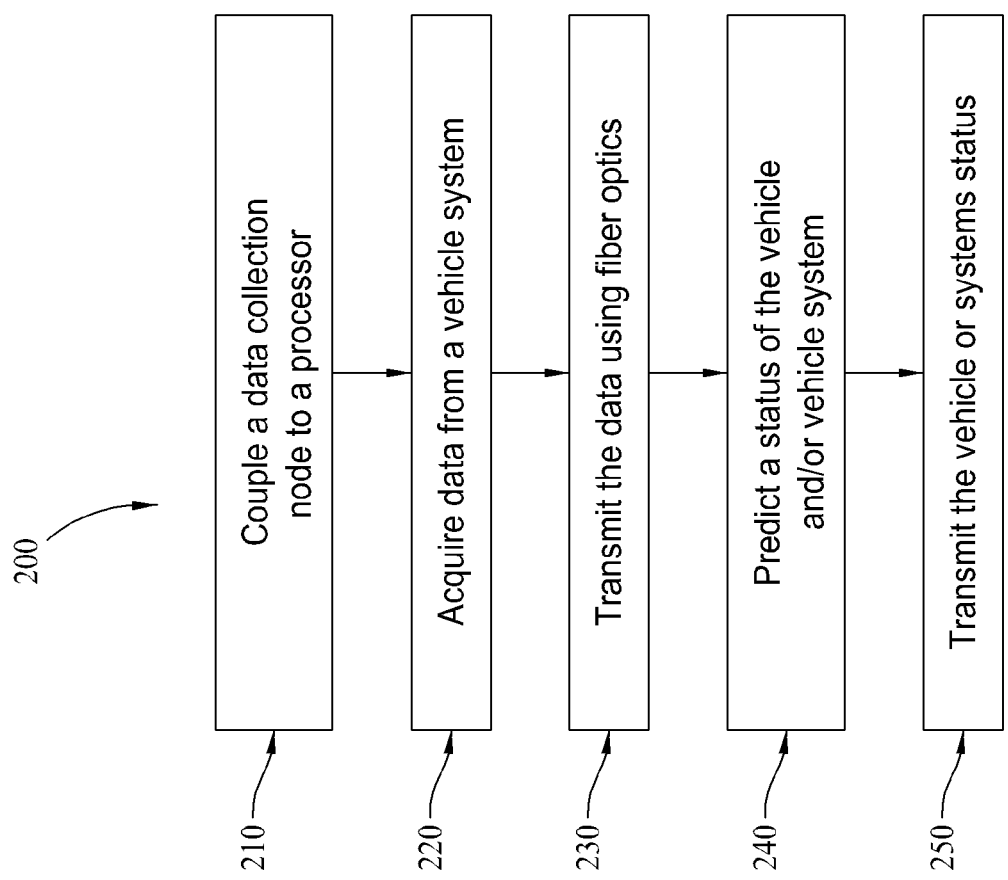
FIG. 5 is a flow diagram of an exemplary method of data collection that may use the system shown in FIG. 1.

FIG. 5 is a flow diagram of an exemplary method 200 of data collection that may use the system shown in FIG. 1. In the exemplary embodiment, a core processor is coupled 210 to a data collection node as described herein. A wiring system is provided for use in communicatively coupling a core processor to at least one of a data collection node and a subsystem node. Specifically, a wire harness is provided that includes multiple, individual conductors grouped together within an overbraid that is sized and oriented to receive the wire harness therein. Alternatively, wiring system includes any grouping of conductors within an overbraid that enables the data collection system to function as described herein. Coupling 210 a core processor to a data collection node via a wiring system further includes integrally weaving at least one fiber optic cable within the overbraid to provide a communications channel from the core processor to a data collection node that provides data relating to vehicle and/or system status, as well as issuing a fault notice should the fiber optics becomes severed during operations, for example, due to wear-and-tear on the wires. Alternatively, a plurality of fiber optic cables is arranged in groups having three fiber optic cables each and each group is then integrally woven within the overbraid. This forms a redundancy in the fiber optic communications channels embedded within wiring system.

In an alternative embodiment, coupling 210 the core processor to the data collection node includes providing a first group of three fiber optic cables, a second group of three fiber optic cables, and a third group of fiber optic cables spaced circumferentially about the overbraid and interweaving each group of fiber optic cables within the overbraid such that each fiber optic cable extends substantially linearly throughout the overbraid. This forms a redundancy in the fiber optic communications channels embedded within wiring system.

Data is then acquired 220 by the data collection node from a sensor node. In the exemplary embodiment, the data is acquired wireless and includes high bandwidth, IVHM data associated with subsystem operation, as described herein. Alternatively, the data may be acquired by the data collection node via any wiring assembly, and may include any avionics, system or subsystem data that enables the core processor to function as described herein.

Data is then transmitted 230 from the data collection node to the core processor via the fiber optic cables. A typical overbraided wire operatively connects the data collection node with the core processor. In the exemplary embodiment, and as described herein, fiber optic cables are integrally woven into the cable overbraid to enable transmission of the data. Alternatively, and as described herein, the fiber optic cables may be interwoven in any fashion that allows the data collection system to function as described herein.

The core processor performs the task of predicting 240 a status of the vehicle or vehicle system based upon the IVHM data that was transmitted 230 from the data collection node or subsystem node. In the exemplary embodiment, the prediction 240 is continuously executed during vehicle operation and the data is then saved in the core processor for later extraction. The core processor will then transmit 250 the prediction externally. This transmission 250 may occur when requested by an outside source, or may be programmed to periodically dump the data and prediction to the outside source.

Further, although the present invention is described with respect to processors and computer programs, as will be appreciated by one of ordinary skill in the art, the present invention may also apply to any system and/or program that is configured to determine (diagnosis) and/or predict (prognosis) the health of a vehicle system or subsystem, and enable the mitigation of adverse events during operation. For example, as used herein, the term processor is not limited to just those integrated circuits referred to in the art as processors, but broadly refers to computers, processors, microcontrollers, microcomputers, programmable logic controllers, application specific integrated circuits, and other programmable circuits. The processor may be part of a computer that may include a device, such as; a floppy disk drive or compact disc-read-only memory (CD-ROM) drive, for reading data from a computer-readable medium, such as a floppy disk, a CD-ROM, a magneto-optical disk (MOD), or a digital versatile disc (DVD).

Exemplary embodiments of data collection systems used in aviation industry are described in detail herein. The disclosed data collection systems include wiring systems fabricated with fiber optics, and may be implemented to facilitate a low cost, low footprint, dual use approach to accessing support critical IVHM data. Moreover, this design is particularly useful to legacy upgrades because 'normal' wire bundles can be replaced with fiber optic embedded wiring systems that can then be plugged into upgraded subsystems with an IVHM interface. Existing solutions rely on using the resources of existing flight and mission critical communication, storage and processing resources for support critical IVHM. The cost of development and implementation in a mission or flight critical environment may be prohibitive for even the major subsystems, such as propulsion systems, since the current avionics designs do not address support critical IVHM requirements.

Although the foregoing description contains many specifics, these should not be construed as limiting the scope of the present invention, but merely as providing illustrations of some of the presently preferred embodiments. Similarly, other embodiments of the invention may be devised which do not depart from the spirit or scope of the present invention. Features from different embodiments may be employed in combination. The scope of the invention is, therefore, indicated and limited only by the appended claims and their legal equivalents, rather than by the foregoing description. All additions, deletions and modifications to the invention as disclosed herein which fall within the meaning and scope of the claims are to be embraced thereby.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A data collection system for a vehicle, said data collection system comprising:
   a first data collection node configured to obtain data from a vehicle subsystem; and
   a processor communicatively coupled to said first data collection node via a wiring system, said wiring system comprising a plurality of conductors and an overbraid circumscribing said plurality of conductors, at least one fiber optic cable integrally woven between an interior and an exterior of said overbraid to form a portion of said overbraid and configured for the transmission of data related to an operational status of the vehicle subsystem between said processor and said first data collection node; wherein said overbraid is at least partially formed from strands that are not fiber optic cables.

2. A data collection system in accordance with claim 1 further comprising an optical transceiver associated with said processor, wherein said data collection node comprises an optical transceiver, said optical transceivers configured to communicate over said at least one fiber optic cable.

3. A data collection system in accordance with claim 1 further comprising a second data collection node positioned within the vehicle that is configured to transmit data to the first data collection node via at least one of an electrical conductor, a wireless interface and a fiber optic interface, wirelessly or via said at least one fiber optic cable.

4. A data collection system in accordance with claim 1 wherein said at least one fiber optic cable further comprises a plurality of optical fibers configured to provide redundant optical paths between said first data collection node and said processor.

5. A data collection system in accordance with claim 1 further comprising a subsystem node positioned within the vehicle that is configured for the transmission of data related to an operational status of the vehicle subsystem via said at least one fiber optic cable.

6. A data collection system in accordance with claim 5 wherein the second data collection node is configured to transmit data wirelessly to the first data collection node.

7. A data collection system in accordance with claim 1 wherein said processor is programmed to:
   determine the current status of at least one of the vehicle and vehicle sub-system using data received from the first data collection node;
   predict a status of at least one of the vehicle and vehicle sub-system using data received from the first data collection node; and
   transmit a status report using the status prediction to a user via a user interface.

8. A wiring system for a vehicle comprising:
   at least one conductor;
   a overbraid circumscribing said at least one conductor; and
   at least one fiber optic cable integrally woven between an interior and an exterior of said overbraid to form a portion of said overbraid and configured for the transmission of data related to an operational status of the vehicle; wherein said overbraid is at least partially formed from strands that are not fiber optic cables.

9. A wiring system in accordance with claim 8 wherein said at least one fiber optic cable comprises a plurality of optical fibers configured to provide redundant optical paths between a first data collection node and a processor.

10. A wiring system in accordance with claim 9 wherein said plurality of optical fibers extends between said data collection node and said processor.

11. A wiring system in accordance with claim 10 wherein each fiber optic cable in the plurality of fiber optic cables transmits the data, such that, if at least one fiber optic cable become damaged, at least one non-damaged fiber optic cable transmits the data to the processor.

12. A wiring system in accordance with claim 10 wherein, if all fiber optic cables become damaged, a fault signal is produced by the processor.

13. A wiring system in accordance with claim 9 wherein said plurality of optical fibers comprises a plurality of groups of fiber optic cables circumferentially-spaced within said overbraid.

14. A wiring system in accordance with claim 8 wherein said at least one fiber optic cable is configured to transmit high bandwidth data.

15. A method for collecting data in a vehicle including an on-board processor, said method comprising:
communicatively coupling a first data collection node to the processor utilizing a wiring system including at least one conductor and an overbraid circumscribing said at least one conductor, a plurality of fiber optic cables woven between an interior and an exterior of said overbraid to form a portion of said overbraid; wherein said overbraid is at least partially formed from strands that are not fiber optic cables;
receiving data from a vehicle subsystem at the first data collection node; and
transmitting data related to an operational status of the vehicle from the first data collection node to the processor via at least one of the fiber optic cables.

16. A method for collecting data in a vehicle in accordance with claim 15 wherein receiving the data from a vehicle subsystem further comprises transmitting the data from a second data collection node to the first data collection node.

17. A method for collecting data in a vehicle in accordance with claim 16, wherein transmitting the data from the second data collection node to the first data collection node further comprises transmitting the data wirelessly.

18. A method for collecting data in a vehicle in accordance with claim 15 further comprising providing the wiring system including the overbraid and the plurality of fiber optic cables integrally woven within the overbraid.

19. A method for collecting data in a vehicle in accordance with claim 18 wherein providing the wiring system including the overbraid and the plurality of fiber optic cables further comprises the plurality of optical fibers configured to provide redundant optical paths between said first data collection node and said processor.

20. A method for collecting data in a vehicle in accordance with claim 15 further comprising:
receiving data relating to a status of at least one of the vehicle and a vehicle sub-system;
determining the current status of at least one of the vehicle and vehicle sub-system using data received from the first data collection node;
predicting the status of at least one of the vehicle and vehicle sub-system based on the received data; and
transmitting a status report using the status prediction to a user via a user interface.

* * * * *